(12) United States Patent
Engmann et al.

(10) Patent No.: US 9,499,250 B2
(45) Date of Patent: Nov. 22, 2016

(54) AIRCRAFT STRUCTURE ARRANGEMENT

(71) Applicant: Airbus Operations GmbH, Hamburg (DE)

(72) Inventors: Joern Engmann, Hamburg (DE); Juergen Neumann, Hamburg (DE); Gerhard Penski, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 349 days.

(21) Appl. No.: 14/083,541

(22) Filed: Nov. 19, 2013

(65) Prior Publication Data

US 2014/0138489 A1 May 22, 2014

Related U.S. Application Data

(60) Provisional application No. 61/728,246, filed on Nov. 20, 2012.

(30) Foreign Application Priority Data

Nov. 20, 2012 (EP) .................................... 12193372

(51) Int. Cl.
*B64C 1/06* (2006.01)
(52) U.S. Cl.
CPC ................ *B64C 1/06* (2013.01); *B64C 1/066* (2013.01); *Y02T 50/46* (2013.01); *Y10T 29/49622* (2015.01)
(58) Field of Classification Search
CPC .......... B64C 1/06; B64C 1/066; B64C 1/061
See application file for complete search history.

(56) References Cited

U.S. PATENT DOCUMENTS

| 5,044,578 | A | | 9/1991 | White et al. |
| 5,201,831 | A | * | 4/1993 | Higgins ................. B64C 1/066 244/118.5 |
| 2009/0205286 | A1 | | 8/2009 | Gimpel et al. |
| 2011/0309197 | A1 | * | 12/2011 | Holvoet .................... B64C 1/40 244/131 |
| 2012/0061513 | A1 | | 3/2012 | Gallant et al. |
| 2012/0156420 | A1 | | 6/2012 | Greiner |

FOREIGN PATENT DOCUMENTS

| DE | 805498 | 5/1951 |
| EP | 0437870 | 7/1991 |

OTHER PUBLICATIONS

European Search Report, Mar. 21, 2013.

* cited by examiner

*Primary Examiner* — Nicholas McFall
(74) *Attorney, Agent, or Firm* — Greer, Burns & Crain Ltd.

(57) ABSTRACT

An aircraft structure arrangement which is in particular suitable to form a part of a secondary structure of an aircraft comprises a first longitudinal profile and a first frame profile. The aircraft structure arrangement further comprises a mounting bracket which is directly attached to both, the first longitudinal profile and the first frame profile. The mounting bracket further is connectable to a component of a primary structure of the aircraft so as to fasten the first longitudinal profile and the first frame profile to the primary structure of the aircraft.

10 Claims, 4 Drawing Sheets

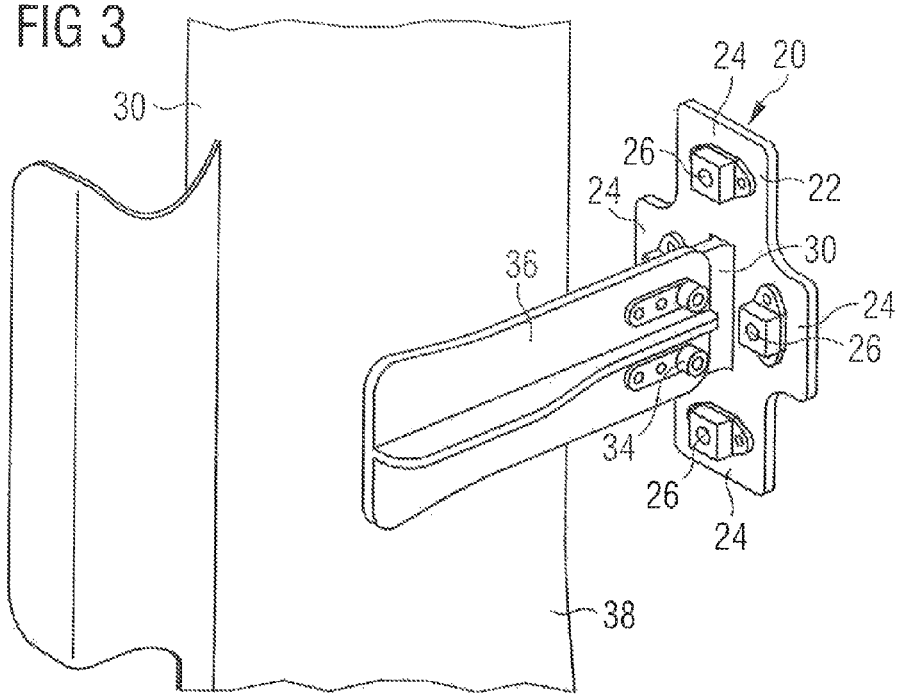
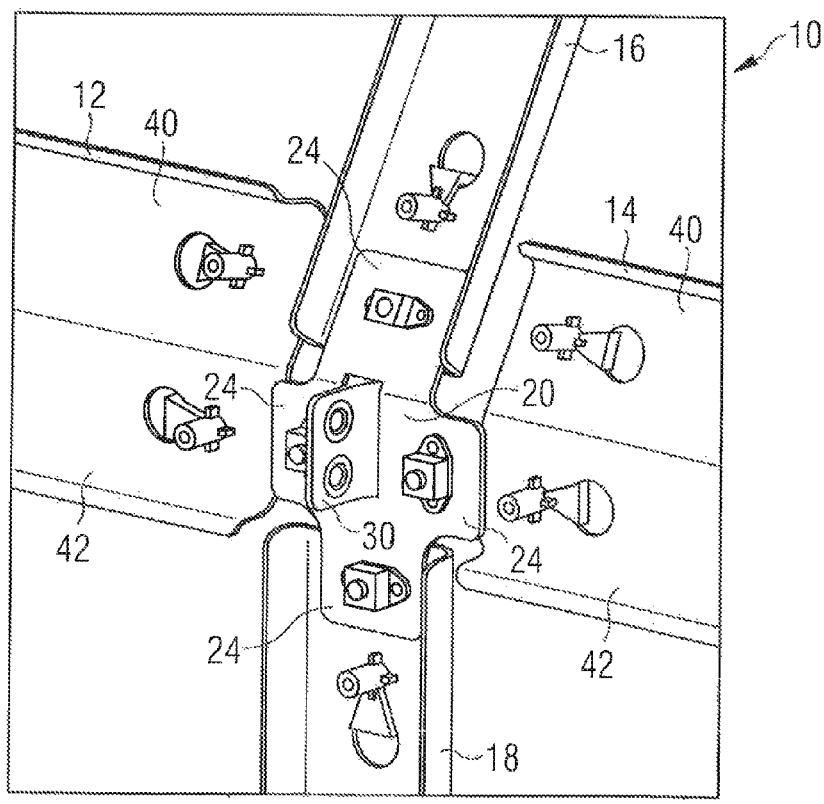

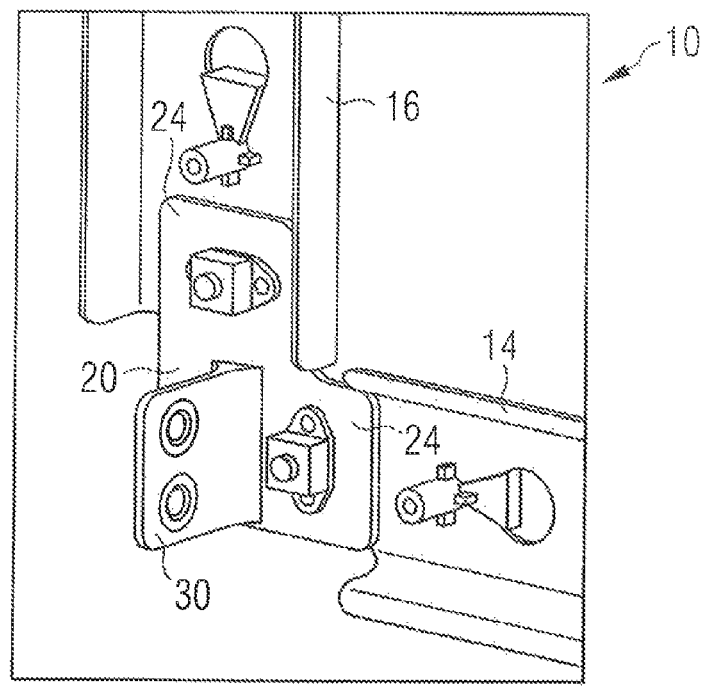
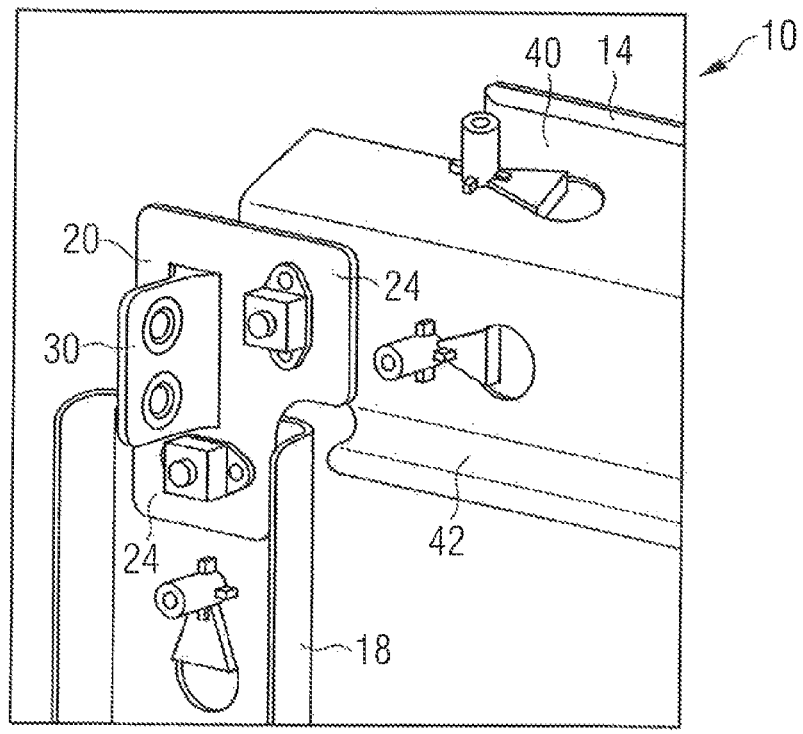

AIRCRAFT STRUCTURE ARRANGEMENT

CROSS-REFERENCES TO RELATED APPLICATIONS

This application claims the benefit of the U.S. Provisional Application No. 61/728,246, filed on Nov. 20, 2012, and of the European patent application No. 12 193 372.5 filed on Nov. 20, 2012, the entire disclosures of which are incorporated herein by way of reference.

BACKGROUND OF THE INVENTION

The invention relates to an aircraft structure arrangement, in particular an aircraft structure arrangement forming a part of an aircraft's secondary structure. Further, the invention relates to a method of mounting an aircraft structure arrangement, in particular an aircraft structure arrangement forming a part of an aircraft's secondary structure.

In modern freight aircraft, the secondary structure which serves to support the lining panels of the aircraft's interior lining comprises a plurality of hydro-formed metal, e.g., aluminium, profiles defining a rigid profile grid. The profile grid comprises a plurality of longitudinal profiles which, when mounted in the aircraft, extend substantially parallel to a longitudinal axis of the aircraft, and a plurality of frame profiles which extend substantially perpendicular to the longitudinal profiles. At the connecting points of the profiles, the so called grid nodes, two frame profiles are attached to a first longitudinal profile. For this purpose, the first longitudinal profile typically is provided with respective attachment portions for receiving respective fastening means, such as e.g., screws, via which the two frame profiles are fastened to the first longitudinal profile. The assembly consisting of the first longitudinal profile and the two frame profiles is connected to a second longitudinal profile by means of a mounting bracket. The mounting bracket is a milled or sheet metal part and may, e.g., be configured in the form of an X-bracket. Typically, the mounting bracket is screwed to the first and the second longitudinal profile. In addition, the mounting bracket also comprises a connecting portion via which the mounting bracket and hence the profile grid attached thereto is fastened to the primary structure of the aircraft. For example, the mounting bracket and hence the profile grid attached thereto may be fastened to a rib of the aircraft's primary structure.

SUMMARY OF THE INVENTION

The invention is directed at the object of providing a light-weight and cost-effective aircraft structure arrangement, in particular an aircraft structure arrangement forming a part of an aircraft's secondary structure. Furthermore, the invention is directed at the object of providing a method of mounting a light-weight and cost-effective aircraft structure arrangement, in particular an aircraft structure arrangement forming a part of an aircraft's secondary structure.

An aircraft structure arrangement according to the invention which is in particular suitable to form a part of a secondary structure of an aircraft comprises a first longitudinal profile. When mounted in the aircraft, the first longitudinal profile may extend substantially parallel to a longitudinal axis of the aircraft, wherein the longitudinal axis of the aircraft extends in a horizontal direction when the aircraft is on the ground or in flight at a constant altitude. It is, however, also conceivable that the longitudinal profile extends at an arbitrary angle with respect to the longitudinal axis of the aircraft.

The aircraft structure arrangement according to the invention further comprises a first frame profile. The first frame profile may extend at an angle of approximately 70 to 110° relative to the first longitudinal profile, wherein, however, also another orientation of the first frame profile relative to the first longitudinal profile is conceivable. Preferably, the first frame profile extends substantially perpendicular to the first longitudinal profile. In case the first longitudinal profile, when mounted in an aircraft, extends substantially parallel to the longitudinal axis of the aircraft, the first frame profile, when mounted in an aircraft, preferably extends substantially perpendicular to the longitudinal axis of the aircraft.

In general, the first longitudinal profile and/or the first frame profile may have any desired shape, cross-section or contour. For example, the first longitudinal profile and/or the first frame profile may have a substantially C-shaped cross-section improving the mechanical properties, in particular, the rigidity of the first longitudinal profile and/or the first frame profile. Further, it is conceivable that the first longitudinal profile and/or the first frame profile may have a shape which is adapted to the shape or the contour of the shell of the aircraft. In particular, the first frame profile may have a shape, i.e., a curvature, which is adapted to the curvature of ribs of the aircraft structure. Further, it is conceivable that the first longitudinal profile and/or the first frame profile may have a first portion and a second portion, the second portion being bent, e.g., at an angle of approximately 120 to 150°, relative to the first portion. The first and the second portion both may extend along a longitudinal axis of the first longitudinal profile and/or the first frame profile.

The aircraft structure arrangement according to the invention further comprises a mounting bracket which is directly attached to both, the first longitudinal profile and the first frame profile. In the context of the present application, the expression "directly attached" means that there is provided an immediate, load transmitting connection between both, the first longitudinal profile and the first frame profile and the mounting bracket. Loads applied onto a first longitudinal profile which is directly attached to a mounting bracket are directly transmitted to the mounting bracket. Similarly, loads applied onto a first frame profile which is directly attached to a mounting bracket are transmitted directly to the mounting bracket. It is, however, still conceivable that small sealing or dampening elements, such as e.g., rubber plates or the like, may be provided at the connection point between the first longitudinal profile and the mounting bracket and/or at the connection point between the first frame profile and the mounting bracket, since these sealing or dampening elements are considered to be associated to either the first longitudinal profile, the first frame profile or the mounting bracket and not to interfere the direct, load transmitting contact between the first longitudinal profile and the mounting bracket and/or between the first frame profile and the mounting bracket.

Further, the mounting bracket is connectable to a component of a primary structure of the aircraft for as to fasten the first longitudinal profile and the first frame profile to the primary structure of the aircraft. The mounting bracket of the aircraft structure arrangement according to the invention thus fulfils a double function. On the one hand, the mounting bracket connects the first longitudinal profile to the first frame profile, thus defining a node of a grid comprising the first longitudinal profile and the first frame profile. On the other hand, the mounting bracket also serves to fasten the assembly comprising the first longitudinal profile, the first frame profile and the mounting bracket to the primary structure of the aircraft. The mounting bracket, for example, may be a welded metal part.

In the aircraft structure arrangement according to the invention it is no longer necessary to provide the first longitudinal profile with an attachment portion for attaching the first frame profile to the first longitudinal profile. It thus becomes possible to use simplified and standardized first longitudinal profile designs. As a result, the number of different parts employed in a profile grid of the aircraft's secondary structure may significantly be reduced allowing a reduction of both, recurring costs and non-recurring costs. In addition, in the aircraft structure arrangement according to the invention, forces applied onto the first longitudinal profile and the first frame profile can be directly transmitted to the mounting bracket. Hence, as compared to the prior art structure design, it is no longer necessary for the first longitudinal profile to transmit forces applied to the first frame profile, before these forces, via the mounting bracket, are directed into the primary structure of the aircraft. The first longitudinal profile therefore may have a lower strength and stiffness, limiting the need to provide the first lower profile with joggles or additional stiffeners leading to a significant reduction of the weight of the first longitudinal profile. Finally, connecting both, the first longitudinal profile and the first frame profile directly to the mounting bracket simplifies the assembly of a grid comprising the first longitudinal profile and the first frame profile in an aircraft, in particular in regions of the aircraft, where the position of the profiles has to be adjusted to the curved contour of the aircraft shell.

In a preferred embodiment of the aircraft structure according to the invention, a second frame profile is present. The second frame profile may have the same features discussed in detail above in connection with the first frame profile. The second frame profile may, at least over a part of its length, extend substantially in the same direction as the first frame profile. It is, however, also conceivable that the second frame profile is oriented at a desired angle of less than 180° relative to the first frame profile. The mounting bracket preferably is directly attached to the second frame profile.

While an aircraft structure arrangement comprising only a first longitudinal profile and a first frame profile is in particular suitable to define a corner of a profile grid of an aircraft's secondary structure, an aircraft structure arrangement comprising a first longitudinal profile as well as a first and a second frame profile may be used to define an edge of the profile grid of the aircraft's secondary structure. The direct connection between the mounting bracket and the second frame profile again ensures that loads applied onto the second frame profile are directly transmitted to the mounting bracket and from the mounting bracket to the aircraft's primary structure.

The aircraft structure arrangement according to the invention may further comprise a second longitudinal profile. The second longitudinal profile may have the same features discussed in detail above in connection with the first longitudinal profile. The second longitudinal profile may, at least over a part of its length, extend substantially in the same direction as the first longitudinal profile. It is, however, also conceivable that the second longitudinal profile is oriented at a desired angle of less than 180° relative to the first longitudinal profile. The mounting bracket may be directly attached to the second longitudinal profile. Similar to a structure arrangement comprising only a first longitudinal profile, but a first and a second frame profile, a structure arrangement comprising a first and a second longitudinal profile, but only a first frame profile, may be used to define an edge of a profile grid of an aircraft's secondary structure. Again, the direct connection between the second longitudinal profile and the mounting bracket ensures that loads applied onto the second longitudinal profile are directly transmitted to the mounting bracket and from the mounting bracket to the aircraft's primary structure.

An aircraft structure arrangement comprising a first and a second longitudinal profile as well as a first and a second frame profile may be used to define an inner node of a profile grid of the aircraft's secondary structure. Of course, the design of the profiles and/or the design of the mounting bracket may be adapted to the intended mounting position of the profiles and/or the mounting bracket within the profile grid of the aircraft's secondary structure. In particular, it is possible to assort a kind of profile grid mounting kit which comprises differently sized and shaped profiles and/or mounting brackets. The number of different parts in the mounting kit, however, still is significantly reduced as compared to the number of different parts employed in a prior art aircraft's secondary structure profile grid.

In the aircraft structure arrangement according to the invention, the mounting bracket may comprise a base portion which may, for example, be plate-shaped. A connection portion may extend from a plane defined by the base portion, preferably at an angle of approximately 70 to 110°, in particular at an angle of approximately 90°. The mounting bracket may further comprise a fastening device for fastening the mounting bracket to the component of the primary structure of the aircraft. Preferably, the fastening device is provided on the connection portion of the mounting bracket. For example, the fastening device may comprise as least one through-hole which is adapted to receive a suitable means, such as for example a screw, for fastening the mounting bracket to the component of the primary structure of the aircraft.

The aircraft structure arrangement according to the invention preferably further comprises a connecting element for connecting the mounting bracket to the component of the primary structure of the aircraft. For example, the connecting element may be a substantially plate-shaped element. The connecting element may be connected to the connecting portion of the mounting bracket. Suitable means, such as at least one screw, may extend through at least one through-hole formed in the connecting element and a suitably aligned through-hole of the fastening device provided on the connection portion of the mounting bracket. The connecting element may be adjusted to standardized attachment points provided on the component of the primary structure of the aircraft, eliminating the need of a mutual adjustment of the attachment point formed on the component of the aircraft's primary structure and the fastening device provided on the mounting bracket. In addition, a connecting element formed separate from the mounting bracket simplifies the compensation of manufacturing or mounting tolerances of the components of the aircraft's primary structure and the components of the aircraft structure arrangement.

The mounting bracket may comprise a plurality of attachment portions, wherein each attachment portion may serve to attach the mounting bracket to a respective longitudinal profile or frame profile. Preferably, the number of attachment portions formed on the mounting bracket is adapted to the number of longitudinal and/or frame profiles attached to the mounting bracket. For example, in case the mounting bracket is intended to be connected to only a first longitudinal profile and only a first frame profile, for example so as to define a corner of a profile grid, the mounting bracket preferably is provided with only two attachment portions. Similarly, three attachment portions may be provided on the mounting bracket in case the mounting bracket is intended to be connected to three profiles, for example two longitudinal profiles and one frame profile or one longitudinal profile and two frame profiles, for example so as to define an edge of a profile grid. Finally, preferably four attachment portions are formed on the mounting bracket in case the mounting bracket is intended to be used at an inner node of the profile grid, i.e., a connection point of two longitudinal profiles and two frame profiles. By adapting the design of the mounting bracket to its specific use within a profile grid of an aircraft's secondary structure, the weight of the profile grid may be optimized. In addition, the design of the mounting bracket may be adapted to the specific load bearing and load transmission requirements at the specific location in the profile grid, allowing the mechanical properties and the stiffness of the profile grid to be optimized.

An attachment portion formed on the mounting bracket preferably extends from the base portion in a direction of the respective longitudinal and/or frame profile attached to the attachment portion. In a preferred embodiment of the aircraft structure arrangement according to the invention, each attachment portion of the mounting bracket extends from the base portion in a direction of the respective longitudinal and/or frame profile attached to the attachment portion. A mounting bracket comprising two attachments portions which, in a profile grid of an aircraft's secondary structure, is used to connect only one longitudinal profile to only one frame profile so as to, for example, define a corner of the profile grid, thus may be substantially L-shaped. To the contrary, a mounting bracket comprising three attachment portions connected to two longitudinal profiles and one frame profile or one longitudinal profile and two frame profiles so as to, for example, define an edge of the profile grid, may be substantially T-shaped. Finally, a mounting bracket having four attachment portions connected to two longitudinal profiles and two frame profiles so as to define an inner node of the profile grid may be substantially cross-shaped.

An orientation of the attachment portion relative to the base portion of the mounting bracket preferably is adjusted to an orientation of the respective longitudinal and/or frame profile attached to the attachment portion relative to the base portion of the mounting bracket. If, for example, a longitudinal and/or frame profile attached to the attachment portion in inclined relative to the base portion of the mounting bracket, i.e., is oriented relative to the base portion of the mounting bracket at an angle of less than 180°, the attachment portion of the mounting bracket, which is connected to said longitudinal and/or frame profile, preferable is oriented at the same angle relative to the base portion of the mounting bracket.

At least one attachment device may be provided in the region of each attachment portion of the mounting bracket. The attachment device preferably extends through a bore which is formed in the respective longitudinal and/or frame profile attached to the attachment portion and which is suitably aligned to the position of the attachment device. The attachment device may, for example, comprise a screw or rivet which extends not only through a bore formed in the respective longitudinal and/or frame profile attached to the attachment portion, but also through a bore formed in the attachment portion. It is, however, also conceivable that the attachment device is fixedly connected to the mounting bracket or formed integral therewith.

A method, according to the invention, of mounting an aircraft structure arrangement which is in particular suitable to form a part of a secondary structure of an aircraft comprises the steps of providing a first longitudinal profile and a first frame profile. A mounting bracket is directly attached to both, the first longitudinal profile and the first frame profile. The mounting bracket is connected to a component of a primary structure of the aircraft so as to fasten the first longitudinal profile and the first frame profile to the primary structure of the aircraft.

In a preferred embodiment of mounting an aircraft structure arrangement, according to the invention, a second frame profile is provided. The mounting bracket is directly attached to the second frame profile.

The method according to the invention may further comprise the steps of providing a second longitudinal profile, and directly attaching the mounting bracket to the second longitudinal profile.

The mounting bracket may be fastened to the component of the primary structure of the aircraft via a fastening device. The fastening device may be formed on a connection portion of the mounting bracket which extends from a plane defined by a base portion of the mounting bracket.

The mounting bracket may be fastened to the component of the primary structure of the aircraft by means of a connecting element. The connecting element may be formed separate from the mounting bracket and may be connected to the connection portion of the mounting bracket.

A longitudinal profile or a frame profile may be attached to a respective attachment portion of the mounting bracket. Preferably, each longitudinal profile or frame profile is attached to a respective attachment portion of the mounting bracket. The number of attachment portions being formed on the mounting bracket may be adapted to the number of longitudinal and/or frame profiles attached to the mounting bracket.

A longitudinal and/or frame profile may be attached to a respective attachment portion of the mounting bracket which extends from the base portion of the mounting bracket in a direction of the respective longitudinal and/or frame profile attached to the attachment portion. Preferably, each longitudinal and/or frame profile is attached to a respective attachment portion of the mounting bracket which extends from the base portion of the mounting bracket in a direction of the respective longitudinal and/or frame profile attached to the attachment portion.

A longitudinal and/or frame profile may be attached to a respective attachment portion of the mounting bracket an orientation of which relative to the base portion of the mounting bracket is adjusted to an orientation of the respective longitudinal and/or frame profile attached to the attachment portion relative to the base portion of the mounting bracket. Preferably, each longitudinal and/or frame profile is attached to a respective attachment portion of the mounting bracket an orientation of which relative to the base portion of the mounting bracket is adjusted to an orientation of the respective longitudinal and/or frame profile attached to the attachment portion relative to the base portion of the mounting bracket.

At least one attachment device may be provided in the region of each attachment portion of the mounting bracket, wherein the attachment device preferably extends through a bore formed in the respective longitudinal and/or frame profile attached to the attachment portion. For example, the bore formed in the longitudinal and/or frame profile may be brought into alignment with the attachment device and the attachment device may be inserted into the bore formed in the longitudinal and/or frame profile so as to connect the longitudinal and/or frame profile to the attachment portion of the mounting bracket.

BRIEF DESCRIPTION OF THE DRAWINGS

Preferred embodiments of the invention are now described in greater detail with reference to the appended schematic drawings, wherein FIG. 3 shows a mounting bracket of the aircraft structure arrangement according to FIG. 1, in a state connected to a component of a primary structure of the aircraft, FIG. 4 shows a three-dimensional front view of a further embodiment of an aircraft structure arrangement, FIG. 7 shows a three-dimensional front view of still a further embodiment of an aircraft structure arrangement, and FIG. 8 shows a three-dimensional front view of still a further embodiment of an aircraft structure arrangement.

DETAILED DESCRIPTION OF THE PREFERRED EMBODIMENTS

Figure 1:
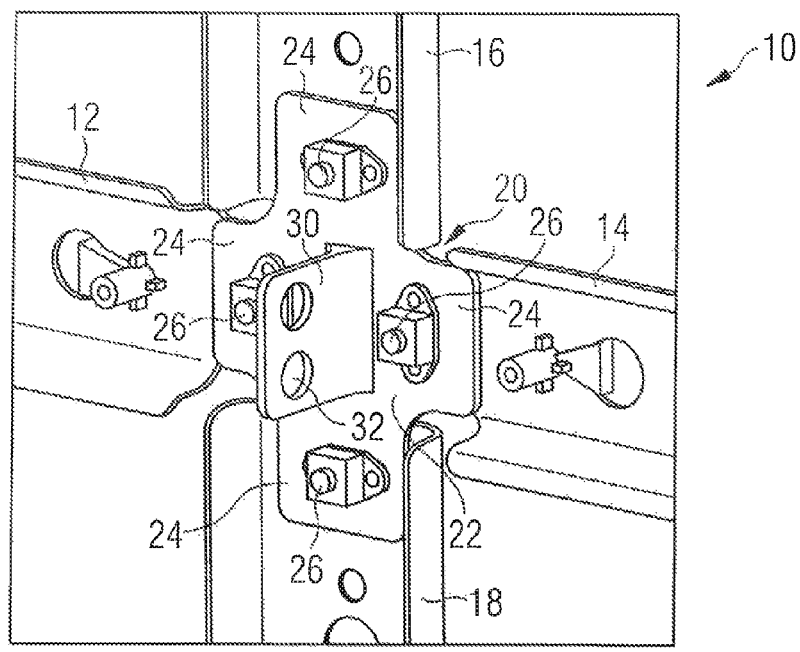
FIG. 1 shows a three-dimensional front view of a first embodiment of an aircraft structure arrangement.

FIG. 1 shows an aircraft structure arrangement 10 which is adapted to form a part of a secondary structure of an aircraft. The secondary structure of the aircraft serves, for example, to support lining panels or insulation elements to be installed in the aircraft. The aircraft structure arrangement 10 comprises a first longitudinal profile 12 which, when the aircraft structure arrangement 10 is installed in an aircraft, extents substantially parallel to a longitudinal axis of the aircraft. A second longitudinal profile 14 is oriented substantially in the same direction as the first longitudinal profile, i.e., forms an extension of the first longitudinal profile in the direction of the longitudinal axis of the aircraft.

The aircraft structure arrangement 10 further comprises a first frame profile 16 which extends substantially perpendicular to the first longitudinal profile 12 and the second longitudinal profile 14. A second frame profile 18 is oriented substantially in the same direction as the first frame profile, i.e., the second frame profile 18 forms an extension of the first frame profile in the direction perpendicular to the first longitudinal profile 12 and the second longitudinal profile 14. When the aircraft structure arrangement 10 is mounted in an aircraft, the first frame profile 16 and the second frame profile 18 extend substantially perpendicular to the longitudinal axis of the aircraft. All profiles 12, 14, 16, 18 have a substantially α-shaped cross-section.

Finally, the aircraft structure arrangement 10 comprises a mounting bracket 20. The mounting bracket 20 is directly attached to the first longitudinal profile 12, the second longitudinal profile 14, the first frame profile 16 and the second frame profile 18. In other words, the mounting bracket 20 is in direct contact with the first longitudinal profile 12, the second longitudinal profile 14, the first frame profile 16 and the second frame profile 18. As a result, forces applied to any one of the profiles 12, 14, 16, 18 are directly transmitted to the mounting bracket 20.

The mounting bracket 20 comprises a plate-shaped base portion 22. Four attachment portions 24 extend in a plane defined by the base portion 22 from the base portion 22 in the direction of the respective profiles 12, 14, 16, 18 attached to the attachment portions 24. The base portion 22, together with the attachment portions 24, thus defines substantially cross-shaped mounting bracket 20.

Each attachment portion 24 is provided with an attachment device 26. As becomes apparent from FIG. 2, the attachment device 26 provided in the region of each attachment portion 24 of the mounting bracket 20 extends through a bore 28 formed in a respective profile 12, 14, 16, 18 so as to attach the profile 12, 14, 16, 18 to the attachment portion 24.

The mounting bracket 20 further comprises a connection portion 30 which extends from the plane defined by the base portion 22 of the mounting bracket 20. Specifically, the connection portion 30 extends substantially perpendicular to the plane defined by the base portion 22 of the mounting bracket 20. The connection portion 30 of the mounting bracket 20 is provided with a fastening device 32. In the embodiment of an aircraft structure arrangement 10 shown in the Figures, the fastening device 32 is defined by two through-holes formed in the connection portion 30. As becomes apparent from FIG. 3, the through-holes formed in the connection portion 30 of the mounting bracket are adapted to receive respective fastening means 34 which may be in the form of screws, rivets or the like for connecting the connection portion 30 of the mounting bracket to a connecting element 36.

The connecting element 36 is formed separate from the mounting bracket 20 and serves to connect the mounting bracket 20, in particular the connection portion 30 of the mounting bracket 20, to a component 38 of the aircraft's primary structure. The connecting element 36 extends substantially perpendicular to the base portion 22 of the mounting bracket 20, i.e., the connecting element 36 forms an extension of the connection portion 30 of the mounting bracket 20.

Figure 2:
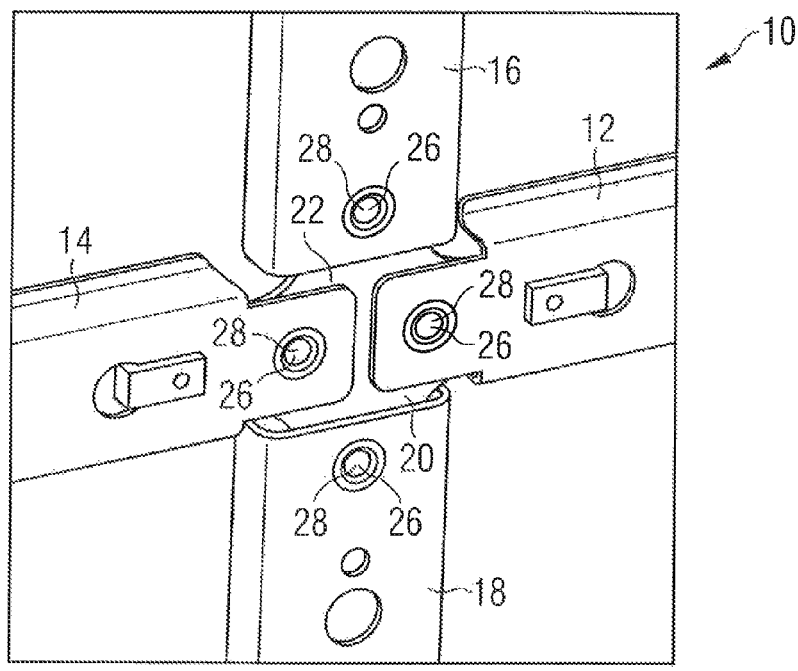
FIG. 2 shows a three-dimensional rear view of the aircraft structure arrangement according to FIG. 1.

A plurality of aircraft structure arrangements 10 may be used to define a profile grid of the aircraft secondary structure. Inner nodes of such a profile grid may be designed as shown in FIGS. 1 and 2. The longitudinal profiles 12, 14 and the frame profiles 16, 18 may be straight profiles or may, over at least a part of their length, be curved. For example, the frame profiles 14, 16 may have a shape, i.e., a curvature, which is adapted to a contour of ribs of the aircraft's primary structure so as to adjust the shape of the profile grid to the curvature of the aircraft shell.

Upon mounting the aircraft structure arrangement 10 in an aircraft, all profiles 12, 14, 16, 18 are directly attached to the mounting bracket 20 via the respective attachment devices 26. Specifically, the profiles 12, 14, 16, 18 are aligned relative to the mounting bracket such that the bores 28 formed in the profiles 12, 14, 16, 18 are brought into alignment with the attachment devices 26 so as to allow the attachment devices 26 to extend through the bores 28 formed in the profiles 12, 14, 16, 18. The mounting bracket 20 is attached to the connecting element 26 and hence to the component 38 of the primary structure of the aircraft by suitably aligning the mounting bracket 20 relative to the connecting element 36 such that the through-holes of the fastening device 32 provided on the connection portion 30 of the mounting bracket 20 are brought into alignment with the fastening means 34 of the connecting element 30.

Upon mounting the aircraft structure arrangement 10 in an aircraft, it is conceivable to first attach the profiles 12, 14, 16, 18 to the mounting bracket 20 and only thereafter attach the mounting bracket 20 to the connecting element 36 and hence to the component 38 of the primary aircraft structure. As an alternative, it is, however, also conceivable to first attach the mounting bracket 20 via the connecting element 36 to the component 38 of the primary structure of the aircraft and only thereafter attach the profiles 12, 14, 16, 18 to the mounting bracket 20.

FIG. 4 shows an alternative embodiment of an aircraft structure arrangement 10 which differs from the arrangement 10 according to FIGS. 1 and 2 in that the first longitudinal profile 12 and the second longitudinal profile 14 have a first portion 40 and a second portion 42, the second portion 42 being bent at an angle of approximately 120 to 150° relative to the first portion 40. The first frame profile 16 is oriented so as to extend substantially in the same plane as the first portion 40 of the longitudinal profiles 12, 14, whereas the second frame profile 18 is oriented so as to extend substantially in the same plane as the second portion 42 of the longitudinal profiles 12, 14. As a result, the first frame profile 16 extends at an angle of approximately 120 to 150° relative to the second frame profile 18.

The attachment portions 24 of the mounting bracket 20 which serve to connect the mounting bracket 20 to the longitudinal profiles 12, 14 extend from the base portions 22 of the mounting bracket 20 in the same plane as the base portion 22 of the mounting bracket 20. These attachment portions 24 are connected to the second portion 42 of the longitudinal profiles 12, 14. Similarly, also the attachment portion 24 which serves to connect the second frame profile 18 to the mounting bracket 20 extends from the base portion 22 of the mounting bracket 20 in the same plane as the base portion 22. Contrary thereto, the attachment portion 24 of the mounting bracket 20 which serves to connect the first frame profiles 16 to the mounting bracket 20 extends at an angle of approximately 120 to 150° from the base portion 22 of the mounting bracket 20. In other words, the orientation of the attachment portion 24 of the mounting bracket 20 which serves to connect the mounting brackets 20 to the first frame profile 16 is adjusted to the orientation of the first frame profile 16.

Otherwise, the structure and the function of the aircraft structure arrangement 10 according to FIG. 4 correspond to the structure and the function of the aircraft structure arrangement 10 as shown in FIGS. 1 and 2.

Figure 5:
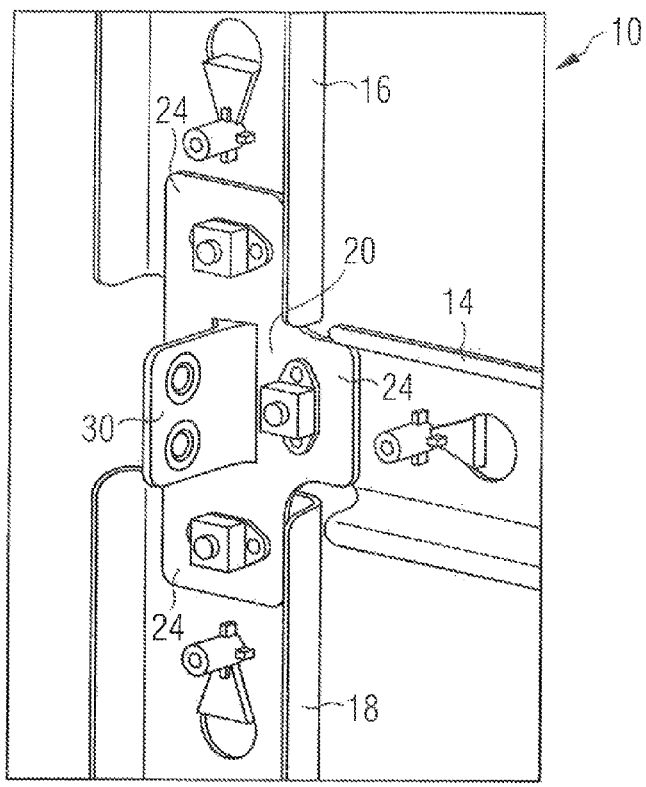
FIG. 5 shows a three-dimensional front view of still a further embodiment of an aircraft structure arrangement.

The embodiment of an aircraft structure arrangement 10 according to FIG. 5 differs from the arrangement 10 shown in FIGS. 1 and 2 in that the arrangement 10 of FIG. 5 comprises only one longitudinal profile 14. The arrangement 10 according to FIG. 5, in a profile grid of a secondary aircraft structure, may, for example, be used to define an edge of the grid. The substantially T-shaped mounting bracket 20 comprises only three attachment portions 24, thus optimizing the weight of the arrangement 10. Otherwise the structure and the function of the aircraft structure arrangement 10 of FIG. 5 correspond to the structure and the function of the aircraft structure arrangement depicted in FIGS. 1 and 2.

Figure 6:
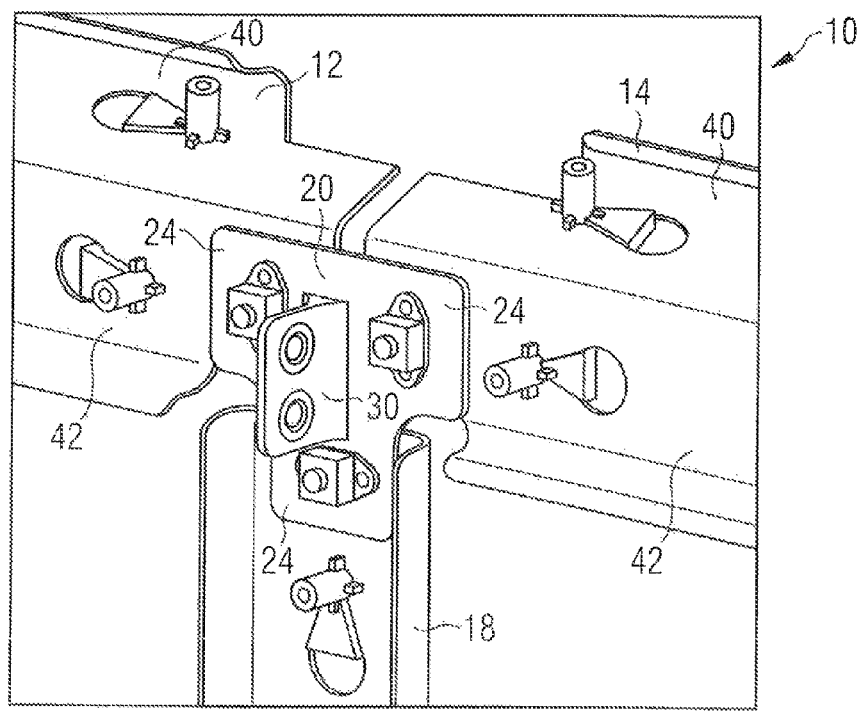
FIG. 6 shows a three-dimensional front view of still a further embodiment of an aircraft structure arrangement.

The aircraft structure arrangement 10 according to FIG. 6 differs from the arrangement 10 shown in FIG. 4 in that the arrangement 10 comprises only one frame profile 18. Specifically, while the second frame profile 18 is still present, the first frame profile 16 of the aircraft structure arrangement 10 according to FIG. 4 is omitted. Similar to the T-shaped mounting bracket 20 shown in FIG. 5, also the T-shaped mounting bracket 20 according to FIG. 6 no longer comprises four attachment portions 24, but merely is provided with three attachment portions 24 connected to the first longitudinal profile 12, the second longitudinal profile 14 and the second frame profile 18.

Finally, the shape of the longitudinal profiles 12, 14 employed in the aircraft structure arrangement 10 depicted in FIG. 6 differs from the shape of the longitudinal profiles 12, 14 employed in the aircraft structure arrangement 10 according to FIG. 4. Specifically, the first portion 40 of the longitudinal profiles 12, 14, in the aircraft structure arrangement 10 of FIG. 6 extends substantially perpendicular to the second portion 42 of the longitudinal profile 12, 14. Otherwise, the structure and the function of the aircraft structure arrangement 10 of FIG. 6 correspond to the structure and the function of the aircraft structure arrangement 10 depicted in FIG. 4.

FIG. 7 shows an aircraft structure arrangement 10 which differs from the arrangement 10 according to FIG. 5 in that now also the second frame profile 18 is omitted, such that the aircraft structure arrangement 10 only comprises the second longitudinal profile 14 and the first frame profile 16. The aircraft structure arrangement 10 of FIG. 7 thus is in particular suitable to define a corner of a profile grid of the aircraft's secondary structure. The L-shaped mounting bracket 20 of the aircraft structure arrangement 10 according to FIG. 7 only comprises two attachment portions 24, resulting in an optimization of the weight of the aircraft structure arrangement 10. Otherwise, the function and the structure of the aircraft structure arrangement 10 according to FIG. 7 correspond to the structure and the function of the aircraft structure arrangement 10 depicted in FIG. 5.

FIG. 8 finally shows an aircraft structure arrangement 10 which differs from the arrangement 10 of FIG. 6 in that the arrangement 10 only comprises the second longitudinal profile 14 and the second frame profile 18. Like in the arrangement 10 of FIG. 7, the L-shaped mounting bracket 20 again comprises only two attachment portions for attaching the mounting brackets 20 to the second longitudinal profile 14 and the second frame profile 18. Like the arrangement 10 of FIG. 7, also the aircraft structure arrangement 10 according to FIG. 8 is suitable to define a corner of a profile grid of an aircraft's secondary structure. Otherwise, the structure and the function of the aircraft structure arrangement 10 according to FIG. 8 correspond to the structure and the function of the arrangement 10 depicted in FIG. 6.

Although specific features of individual components of an aircraft structure arrangement herein are described in connection with specific embodiments of the aircraft structure arrangement, the features can also be present in other embodiments. For example, an aircraft structure arrangement comprising only two or only three profile elements may be equipped with longitudinal profiles as described in connection with the aircraft structure arrangement of FIG. 4. Further, it is, of course, also conceivable to provide an aircraft structure arrangement comprising two longitudinal profiles and two frame profiles with longitudinal profiles as employed in the aircraft structure arrangements depicted in FIGS. 6 and 8.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An aircraft structure arrangement forming a part of a secondary structure of an aircraft and which comprises:

a first longitudinal profile,
a first frame profile, and
a mounting bracket,
wherein the mounting bracket is directly attached to both the first longitudinal profile and the first frame profile, and wherein the mounting bracket further is connectable to a component of a primary structure of the aircraft so as to fasten the first longitudinal profile and the first frame profile to the primary structure of the aircraft, wherein the mounting bracket comprises a plurality of attachment portions, each attachment portion serving to attach the mounting bracket to a respective longitudinal profile or frame profile, wherein the number of attachment portions formed on the mounting bracket is adapted to the number of longitudinal and frame profiles attached to the mounting bracket, further comprising at least one of a second frame profile, wherein the mounting bracket is directly attached to the second frame profile, and a second longitudinal profile, wherein the mounting bracket is directly attached to the second longitudinal profile.

2. The aircraft structure arrangement according to claim 1, wherein the mounting bracket comprises a base portion and a connection portion, the connection portion extending from a plane defined by the base portion and comprising a fastening device for fastening the mounting bracket to the component of the primary structure of the aircraft.

3. The aircraft structure arrangement according to claim 1, further comprising a connecting element for connecting the mounting bracket to the component of the primary structure of the aircraft, the connecting element being connected to a connection portion of the mounting bracket.

4. The aircraft structure arrangement according to claim 1, wherein at least one of each attachment portion extends from the base portion of the mounting bracket in a direction of the respective longitudinal and frame profile attached to the attachment portion, and an orientation of the attachment portion relative to the base portion of the mounting bracket is adjusted to an orientation of the respective longitudinal and frame profile attached to the attachment portion relative to the base portion of the mounting bracket.

5. The aircraft structure arrangement according to claim 1, wherein at least one attachment device is provided in the region of each attachment portion of the mounting bracket, the attachment device extending through a bore formed in the respective longitudinal and frame profile attached to the attachment portion.

6. A method of mounting an aircraft structure arrangement to form a part of a secondary structure of an aircraft, the method comprising:

providing a first longitudinal profile,
    providing a first frame profile,
    directly attaching a mounting bracket to both, the first longitudinal profile and the first frame profile, and
    connecting the mounting bracket to a component of a primary structure of the aircraft so as to fasten the first longitudinal profile and the first frame profile to the primary structure of the aircraft, wherein each longitudinal or frame profile is attached to a respective attachment portion of the mounting bracket, wherein the number of attachment portions formed on the mounting bracket is adapted to the number of longitudinal and frame profiles attached to the mounting bracket, further comprising at least one of:

providing a second frame profile, and directly attaching the mounting bracket to the second frame profile, and providing a second longitudinal profile, and directly attaching the mounting bracket to the second longitudinal profile.

7. The method according to claim 6, wherein at least one of:

the mounting bracket is fastened to the component of the primary structure of the aircraft via of a fastening device, the fastening device being formed on a connection portion of the mounting bracket extending from a plane defined by a base portion of the mounting bracket, and the mounting bracket is fastened to the component of the primary structure of the aircraft by means of a connecting element, the connecting element being connected to the connection portion of the mounting bracket.

8. The method arrangement according to claim 6, wherein at least one of each longitudinal and frame profile is attached to a respective attachment portion of the mounting bracket, wherein the attachment portion extends from the base portion of the mounting bracket in a direction of the respective longitudinal and frame profile attached to the attachment portion, and each longitudinal and frame profile is attached to a respective attachment portion of the mounting bracket, wherein an orientation of the attachment portion relative to the base portion of the mounting bracket is adjusted to an orientation of the respective longitudinal and frame profile attached to the attachment portion, relative to the base portion of the mounting bracket.

9. The method according to claim 6, wherein each longitudinal and frame profile is attached to a respective attachment portion of the mounting bracket by means of at least one attachment device provided in the region of the attachment portion, the attachment device extending though a bore formed in the respective longitudinal and frame profile attached to the attachment portion.

10. An aircraft structure system comprising a plurality of aircraft structure arrangements according to claim 1.

* * * * *